UNITED STATES PATENT OFFICE.

JAMES D. MEIGHER, OF TITUSVILLE, PENNSYLVANIA, ASSIGNOR TO HIMSELF AND JOSEPH DIXON, OF SAME PLACE.

IMPROVEMENT IN VARNISHES.

Specification forming part of Letters Patent No. 213,342, dated March 18, 1879; application filed September 3, 1878.

*To all whom it may concern:*

Be it known that I, JAMES D. MEIGHER, of Titusville, county of Crawford, State of Pennsylvania, have invented a certain Compound or Oil for Paint Purposes, of which the following is a specification:

This invention is for an oil used in mixing paint for the purposes of common house-painting, &c.; and consists in a composition formed by compounding the distillate of petroleum, paraffine obtained from petroleum, crude petroleum, resin, soft water, and gum-shellac, compounded substantially in the proportions and manner described in the following formula.

Take of the distillate of crude petroleum, "cut off" when the tar-gravity is 24° Baumé, forty-three gallons. Put it in an open pan or tank, and shower it with water until free from smell and of a light color. Then add twenty pounds of pulverized resin, (white preferred,) and stir till the resin is dissolved. Add forty-three gallons crude petroleum, (amber preferred.) Then add ten pounds paraffine derived from petroleum, and five gallons distillate, previously well mixed and dissolved. In a separate vessel mix four gallons soft water with eight pounds sal-soda, (or any alkali,) heat them to boiling-point, and stir till dissolved. Then add ten pounds gum-shellac, place over a slow fire, and stir till dissolved. Mix this preparation with that previously described, and agitate the whole for fifteen or twenty minutes at a temperature not exceeding 120° Fahrenheit. Decant the oil, let it stand twelve hours, and it is ready for use. Any slight change made in the proportions above given will not materially affect the value of the product.

I claim as my invention—

A compound consisting of the distillate of crude petroleum, resin, crude petroleum, paraffine, soft water, sal-soda, or other alkali, and gum-shellac, compounded substantially as described, and for the purposes herein set forth.

J. D. MEIGHER.

Witnesses:
JOSEPH SMITH,
W. A. DIXON.